(12) United States Patent
Huber

(10) Patent No.: US 9,468,138 B2
(45) Date of Patent: Oct. 18, 2016

(54) IMPLEMENT FOR A TRACTOR HITCH

(71) Applicant: CNH Industrial America LLC, New Holland, PA (US)

(72) Inventor: Roland Huber, Waldhausen (AT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/533,619

(22) Filed: Nov. 5, 2014

(65) Prior Publication Data

US 2015/0122518 A1 May 7, 2015

(30) Foreign Application Priority Data

Nov. 7, 2013 (IT) ............... MO2013A0308

(51) Int. Cl.
*A01B 59/00* (2006.01)
*A01B 59/06* (2006.01)
*B60D 1/00* (2006.01)

(52) U.S. Cl.
CPC ........... *A01B 59/008* (2013.01); *A01B 59/066* (2013.01); *B60D 2001/008* (2013.01)

(58) Field of Classification Search
CPC .................................................... A01B 59/008
USPC ................................................. 172/439, 677
See application file for complete search history.

(56) References Cited

U.S. PATENT DOCUMENTS 2,673,507 A * 3/1954 Sawyer ................ A01B 59/008
178/23 A
2,674,169 A * 4/1954 Sawyer ................ A01B 59/008
280/477
3,017,200 A * 1/1962 Du Shane ............ A01B 59/008
280/477
3,056,458 A * 10/1962 Gray .................... A01B 59/004
172/239
3,220,751 A * 11/1965 Tweedale ............. A01B 59/062
172/272
5,009,443 A * 4/1991 Howatt ................ A01B 59/008
172/272
6,352,123 B1 3/2002 Schlegel et al.

FOREIGN PATENT DOCUMENTS

| EP | 1795060 | 6/2007 |
|---|---|---|
| EP | 1795060 A1 | 6/2007 |
| EP | 2449868 | 5/2012 |
| EP | 2449868 A1 | 5/2012 |
| GB | 870883 | 6/1961 |
| GB | 870883 A | 6/1961 |

OTHER PUBLICATIONS 10 43381 / IT M020130308, Dated Jul. 11, 2014, with English Translation (7 pages).

* cited by examiner

*Primary Examiner* — Thomas B Will
*Assistant Examiner* — Joel F. Mitchell
(74) *Attorney, Agent, or Firm* — Rickard K. DeMille

(57) ABSTRACT

An implement hitch is disclosed for a tractor having arms for attachment to an implement, wherein the arms have part-spherical sockets at their free ends for receiving coupling balls which during operation receive coupling pins on the implement to be connected by means of the hitch to the tractor. The hitch has lifting arms that are each movable by a respective hydraulic cylinder and are connected to the associated hydraulic cylinder by a linkage that incorporates at least one pivot pin. In the invention, at least one of the pivot pins has a projecting extension dimensioned to fit within the through bore of a coupling ball and a stop is provided on the extension to prevent a coupling ball supported by the pivot pin from sliding off the extension.

9 Claims, 2 Drawing Sheets

IMPLEMENT FOR A TRACTOR HITCH

CROSS REFERENCE TO RELATED APPLICATIONS

This patent application claims priority from and the benefit of Italian Patent Application Serial No. MO2013A000308, entitled "IMPLEMENT HITCH FOR A TRACTOR", filed Nov. 7, 2013, which is hereby incorporated by reference in its entirety.

FIELD OF THE INVENTION

The invention relates to an implement hitch for a tractor.

BACKGROUND OF THE INVENTION

Agricultural tractors are fitted at the front and/or at the rear with a hitch, also termed a hydraulic power lift, for attachment of towed implements, such as ploughs or harrows. A three-point hitch comprises two hydraulically powered lower lifting arms, and an upper arm, also termed a top link, positioned above and centrally between the lifting arms. Each lifting arm commonly forms part of a parallelogram-like lever system comprising mutually pivoted links of which an upper link is connected to a hydraulic cylinder, to allow the lower arm to be raised and lowered. In the case of a front hitch, each lifting arm of the hitch may additionally be pivotably connected to the lower link so that it may be moved manually between a deployed position and a parked position. In this case, the lifting arm is retained in one of these two positions by means of locking pin that passing through holes in the lower link and the lifting arm.

At its free end, each of the three arms of the hitch has a coupling element in the form an upwardly facing part-spherical socket for receiving a coupling ball and a latch for retaining the coupling ball within the socket. The ball has a through bore to receive a coupling pin on the implement being towed. The ball and socket together avoid the hitch arms and implement coupling pins from being stressed when the towed implement is not precisely aligned with the tractor.

Coupling balls come in different shapes and sizes and are selected to suit the implement to be towed by the tractor. In particular, the size of the coupling pins will vary between implements and the outer diameter of the coupling balls may vary between the lifting arms and the top link. Furthermore, different variants of coupling balls exist, for example with and without cylindrical shoulders on the opposite sides of the through bore. As a result of this, a tractor is required to carry several coupling balls to suit all eventualities and these balls need to be stored in a convenient manner because they cannot be left on the arms of the hitch, nor can they be left on the towed implement.

Conventionally, the coupling balls have been kept in a toolbox, stored near the cab entrance. The disadvantage of storing coupling balls in this manner is that they are far removed from the hitch and the operator has to keep moving from the hitch to the toolbox to collect or replace the coupling balls one at a time.

This problem has been addressed in EP 1795060, which is believed to represent the closest prior art of the present invention. The solution proposed EP 1795060 is to provide a holder that can be mounted near the hitch, the holder comprising a rear wall, two side walls and an open upper end, the side walls retaining the balls within the holder with the inside surfaces of the side wall in contact with portions of the spherical surfaces of the balls which face away from the rear wall, and bias means for biasing the balls into contact with the inside surfaces of the side walls.

OBJECT OF THE INVENTION

The present invention seeks to provide an alternative solution to the problem of conveniently storing coupling balls on a tractor when they are not in use.

SUMMARY OF THE INVENTION

According to the present invention, there is provided an implement hitch for a tractor having arms for attachment to an implement, the arms having part-spherical sockets at their free ends for receiving coupling balls which during operation receive coupling pins on the implement to be connected by means of the hitch to the tractor, the hitch having lifting arms that are each movable by a respective hydraulic cylinder and are connected to the associated hydraulic cylinder by a linkage that incorporates at least one pivot pin, characterized in that at least one of the pivot pins has a projecting extension dimensioned to fit within the through bore of a coupling ball and in that a stop is provided on the extension to prevent a coupling ball supported by the pivot pin from sliding off the extension.

The invention uses extensions on pins that are already present in hitches to support and retain coupling balls, when the latter are not in use. The advantage offered by the invention is that the coupling balls are stored on the hitch itself and are therefore immediately available when required and there is no risk of their being misplaced. As each coupling ball is removed from a hitch arm, it can be placed over a laterally projecting extension of one of the pivot pins in the linkage supporting the same arm, so that when next the coupling ball is required, it will be located at the position where it is needed. If balls of different outside diameter are used on different arms of the hitch, confusion is avoided because each ball will be stored next to a socket within which it will fit.

The dimensions of the pin extensions and the positions of the stops may be selected to suit coupling balls for different implement categories, and in some embodiments multiple balls may be supported on the same pivot pin extension. In this case, the extension may have a stepped diameter to receive coupling balls having through bores of progressively reducing size.

The stops for preventing the balls from sliding off the pin extensions may suitably comprise transverse holes in the extensions to receive spring clips, such as R-shaped springs, or retaining pegs. The pegs or spring clips may each be connected to a component of the hitch by means of a cable or chain, to prevent them from being dropped or mislaid.

It is preferred for ease of access and in order to protect stored balls from dirt thrown up by the wheels of the tractor for the pivot pins to be extended on their side facing toward and located nearer to the centre line of the hitch.

In some embodiments, the extensions for supporting the coupling balls are provided on pivot pins that connect the hydraulic cylinders to the tractor chassis.

In the case of a front hitch, each lifting arm may be pivotably connected to a lower link of the hydraulically powered linkage so that it may be moved manually between a deployed position and a stowed position. In such hitches, it is advantageous to provide the coupling ball supporting extensions on the pivot pins of the lifting arms.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
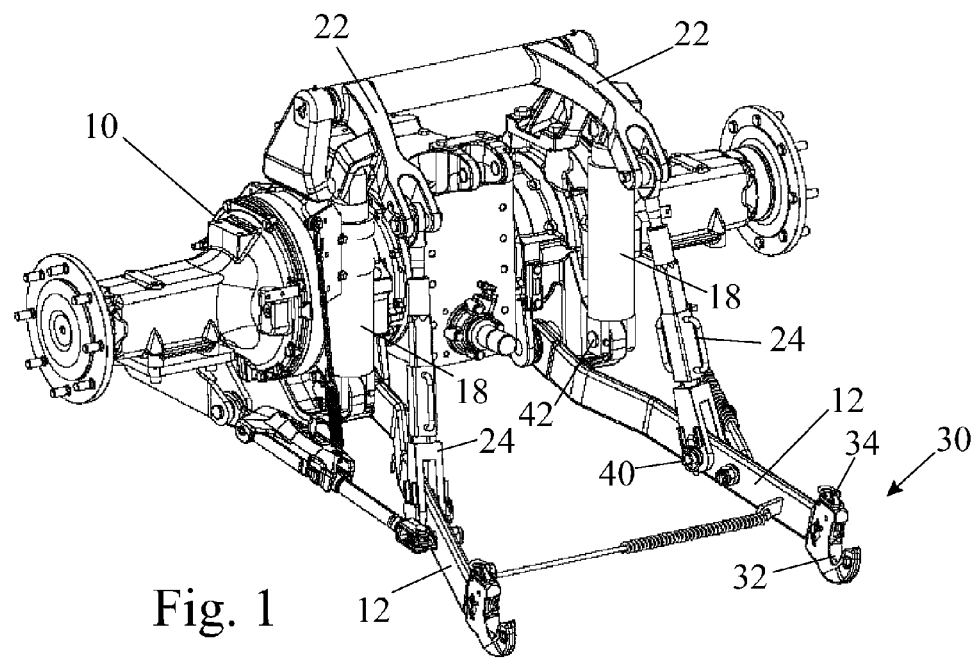
FIG. 1 is a perspective view of a rear three point hitch with the top link omitted for the sake of clarity.

FIG. 1 shows a three-point hitch as fitted to the rear end of known tractors. The hitch is secured to the rear axle 10 of the tractor and comprises two lifting arms 12 and a top link (not shown) that is pivotably mounted between two support flanges. Each of the lifting arms 12 can be raised and lowered hydraulically and forms part of a parallelogram-like linkage of which an upper link 22 is connected to a hydraulic cylinder 18. Extension of the hydraulic cylinder 18 pivots the upper link 22 upwards relative to the tractor chassis and that movement is transferred to the lifting arm 12 by a strut 24. The drawing also shows various other components, such as a power take off shaft and a mechanism for stabilising lateral movement of the lifting arms 12 but these need not be described within the present context.

The ends of the lifting arms 12 are fitted with coupling elements 30 for attachment of the implement to be towed. The coupling element 30 have an upward facing part-spherical socket 32, to receive a ball having a through bore, and latch 34 to retain the ball within the socket. A coupling pin of implement is received within the through bore of the ball to complete the coupling.

To solve the problem of where to store the coupling balls when they are not in use, the invention proposes slipping the balls onto extensions of pivot pins that are present in the support linkage of the lifting arms 12. The manner in which the pivot pins can be extended will be described in greater detail by reference to an embodiment of the invention relating to a front mounted three-point hitch but in FIG. 1 suitable pivot pins have been designated 40 and 42. The pivot pin 40 connects the lifting arm 12 to the strut 24 while the pivot pin 42 connects the lower end of the hydraulic cylinder 18 to the chassis formed by the rear axle 10 of the tractor.

Figure 2:
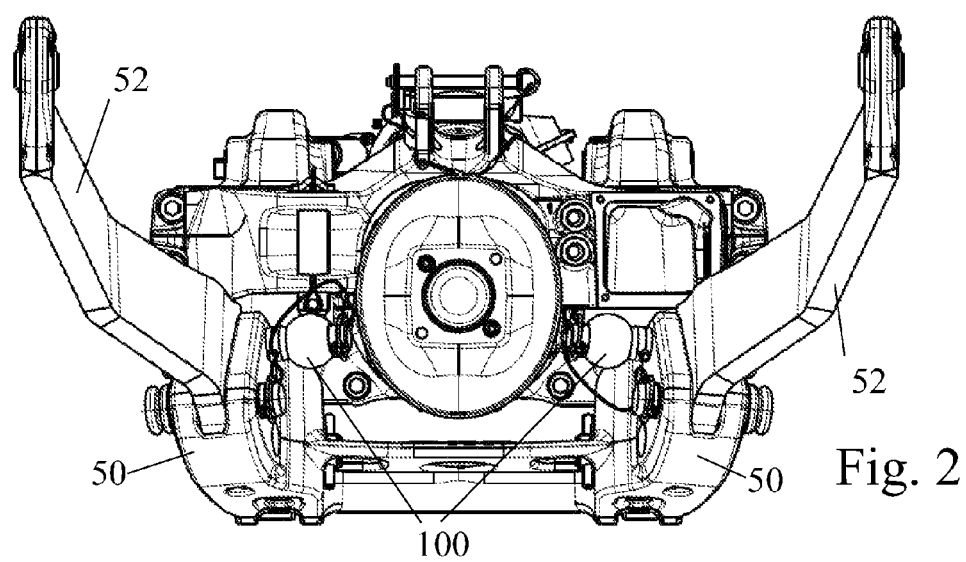
FIG. 2 is a front view of a three-point hitch for the front end of a tractor.

A hitch for the front end of a tractor, shown in FIG. 2, also has a hydraulic cylinder (not shown in the drawing) for raising and lowering a support element 50 to which a lifting arm 52 is pivotably connected. The lifting arm in this embodiment of the invention is pivoted relative to the support element 50 to allow it to be moved manually between a deployed position and stowed position, as will be described with reference to FIGS. 3 and 4. FIG. 2 shows how coupling balls 100 may be supported on extensions of the pivot pins connecting the lifting arms 52 to their support elements 50, this detail being shown to an enlarged scale in FIGS. 3 and 4.

Figure 3:
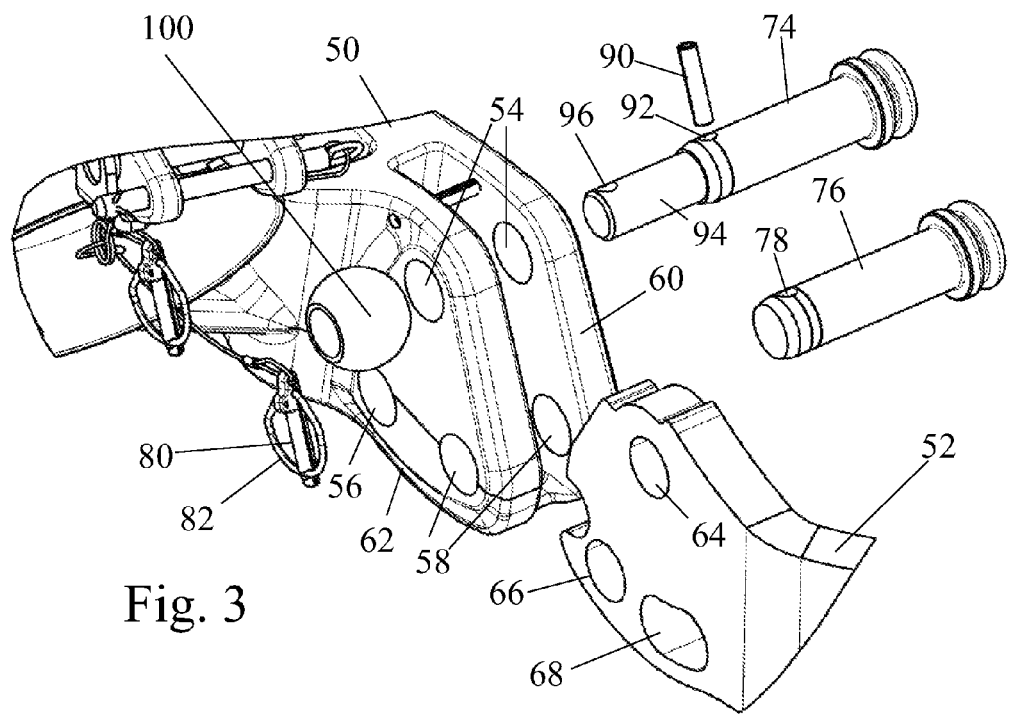
FIG. 3 is an exploded perspective view of a detail of the hitch shown in FIG. 2.

FIG. 3 shows that the end of lifting arm 52 fits between two cheeks 60, 62 of the support member 50 and has three holes 64, 66 and 68. The cheeks 60, 62 are likewise formed with three holes 54, 56 and 58. The holes 54, 64 permanently received receive a pivot pin 74 about which the lifting arm 52 may swivel. The holes 56, 66 and 58, 68 are for receiving a locking pin 76 to retain the lifting arm 52 in the desired attitude.

To move the lifting arm to the stowed position 52, the locking pin 76 is first withdrawn to allow the lifting arm 52 to be raised manually. When the hole 66 is aligned with the holes 58, the locking pin is inserted into them to lock the lifting arm 52 to the support member 50.

To move the lifting arm to its deployed position, the locking pin is once again removed, the lifting arm is allowed to drop to align the holes 56 and 66. With the lifting arm in its deployed position, the locking pin 76 may either be inserted into the holes 56, 66 to lock the lifting arm 52 to the support member 50 or into the holes 58, 68 to allow a degree of lost motion between the lifting arm 52 and the support member 50 on account of the elongation of the hole 58.

As with the rear mounted three-point hitch, the components of the front mounted three-point hitch as so far described are conventional and need not be described in detail. It suffices for the present invention to realise that the hitch affords access to a pivot pin 74 that may be used to support coupling balls that are not in current use.

Figure 4:
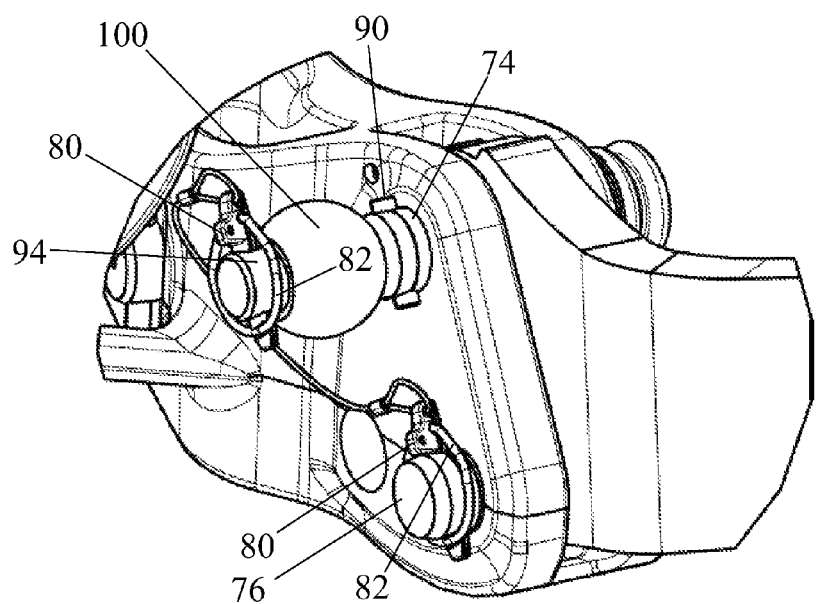
FIG. 4 shows of the detail shown in FIG. 3 when in its assembled state.

The locking pin 76, as can clearly be seen in the assembled view of FIG. 4 only slightly protrudes beyond the cheek 62 of the support member 50. This is to enable a retainer to be fitted to the locking pin 76 so that it may not be displaced accidentally. The retains may assume any of a variety of forms but the retainer illustrated comprises a transverse hole 78 in the locking pin to receive a peg 80 that is held in place by a ring 82 slipped over the end of the locking pin 76. An alternative, one may use a cotter pin or an R-shaped clip.

The pivot pin 74, on the other hand, in addition to being retained on the support member by means of a peg 90 inserted into a transverse hole 92 has an extension 94 which projects beyond the cheek 62 by a distance exceeding the diameter of a coupling ball 100. The diameter of the extension 94 is dimensioned to fit within the through bore of a coupling ball 100. A further transverse bore 96 and a peg 82 held by a ring 82 are provided to retain the coupling ball 100 on the extension.

When coupling the tractor to an implement, the lifting arm is first moved to its deployed position by removal then replacement of the locking pin 76. Next the ball 100 is slid off the extension 94 of the pivot pin 74 after first removing the peg 82. The ball 100 is then slid over the coupling pin of the implement, inserted into the socket 32 of the lifting arm and the held captive by the latch 34.

To disengage the implement from the tractor the above steps are reversed namely, after release of the latch 34, the ball 10 is withdrawn from the socket 32 and then slid of the implement coupling pin. The ball is stored by sliding into onto the extension 94 of the pivot 74 and prevent from sliding off by a peg 80. Last the lifting arm is moved to its stowed position after first removing then replacing the locking pin 76.

Because the coupling balls 100 are stored by mounting them on extensions of pivot pins of the hitch they are always available immediately to hand when they are required.

Though the invention has been described by reference to specific pivot pins of the hitches, extensions may be provided on any other pivot pin on the hitch in addition to or instead of the ones described. Other pivot pins on the hitch a.o. include pivot pins on the lower link frame, pivot pins on lifting cylinders 18, pivot pins on the top link. Further pivot pins may include pivot pins on side stabilizers, struts 24 or upper links 22.

Furthermore, it is possible to store more than on coupling ball on an extension of any one pivot pin and the balls stored on the same pin need not be of the same size.

In selecting the pivot pins used to stored coupling balls and which side of a pin to extend, it is desirable to choose positions for the coupling balls where they are easily accessible and best protected from dirt and the elements.

The invention claimed is:

1. An implement hitch for coupling an implement to a tractor, the implement hitch comprising:
   a coupling ball defining a bore;
   an arm extending between a first end and a free end opposite the first end, the free end of the arm including a part-spherical socket, the arm defining an arm opening spaced apart from the part-spherical socket in a direction of the tractor;
   a linkage coupled between the arm and a separate component of the tractor, the linkage defining at least one linkage opening aligned with the arm opening;
   a pivot pin extending through the arm opening and the at least one linkage opening to couple the linkage to the arm at a location of the arm opening, the pivot pin including an extended portion extending outwardly from the linkage and the arm, the extended portion being received within the bore of the coupling ball such that the coupling ball is positioned on the pivot pin; and
   a retainer configured to be coupled to the pivot pin so as to maintain the coupling ball on the extended portion of the pivot pin.

2. The implement hitch of claim 1, wherein the separate component corresponds to a hydraulic cylinder of the implement hitch, the hydraulic cylinder configured to raise and lower the arm.

3. The implement hitch of claim 1, wherein the arm further defines a second arm opening and the linkage defines at least one second linkage opening configured to be aligned within the second arm opening.

4. The implement hitch of claim 3, further comprising a locking pin received through the second arm opening and the at least one second linkage opening, the locking pin configured to prevent pivotal motion of the arm relative to the linkage about the pivot pin.

5. The implement hitch of claim 1, wherein the linkage includes a first cheek and a second cheek spaced apart from the first cheek, a portion of the arm defining the arm opening being received between the first and second cheeks.

6. The implement hitch of claim 5, wherein the at least one linkage opening includes a first linkage opening defined through the first cheek and a second linkage opening defined through the second cheek, the pivot pin extending through the arm opening and the first and second linkage openings.

7. The implement hitch of claim 1, wherein the retainer includes a peg, the peg being received within a first transverse opening defined through the pivot pin.

8. The implement hitch of claim 7, further comprising a second transverse opening spaced apart from the first transverse opening along a length of the pivot pin, further comprising a second peg configured to be received within the second traverse opening, the first and second transverse openings being positioned on opposite sides of the coupling ball.

9. The implement hitch of claim 1, wherein the coupling ball includes a first side positioned adjacent to at least one of the arm or the linkage and a second side opposite the first side, the retainer being coupled to the pivot pin adjacent to the second side of the coupling ball to maintain the coupling ball on the extended portion of the pivot pin.

* * * * *